United States Patent
Landes

(10) Patent No.: US 7,517,300 B2
(45) Date of Patent: Apr. 14, 2009

(54) RETARDING SYSTEM IMPLEMENTING TORQUE CONVERTER LOCKUP

(75) Inventor: James W. Landes, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 339 days.

(21) Appl. No.: 11/261,573

(22) Filed: Oct. 31, 2005

(65) Prior Publication Data

US 2007/0099757 A1 May 3, 2007

(51) Int. Cl.
B60W 10/02 (2006.01)

(52) U.S. Cl. .................................................. 477/77

(58) Field of Classification Search ............. 477/73, 477/74, 75, 77, 78, 84, 85, 168, 169, 171, 477/173, 175

See application file for complete search history.

(56) References Cited

U.S. PATENT DOCUMENTS

| | | | |
|---|---|---|---|
| 4,463,842 A | 8/1984 | Redzinski | |
| 4,944,199 A | 7/1990 | Okino et al. | |
| 4,961,484 A | 10/1990 | Kato et al. | |
| 5,040,648 A * | 8/1991 | Mitchell et al. | 477/65 |
| 5,088,582 A | 2/1992 | Saitou et al. | |
| 5,551,932 A | 9/1996 | Ishii et al. | |
| 5,609,547 A | 3/1997 | Matsushita et al. | |
| 5,616,100 A * | 4/1997 | Sakai et al. | 477/169 |
| 5,655,407 A | 8/1997 | Dresden, III et al. | |
| 5,787,379 A | 7/1998 | Ochiai et al. | |
| 5,803,217 A | 9/1998 | Park | |
| 5,842,376 A | 12/1998 | Dresden, III et al. | |
| 5,921,883 A | 7/1999 | Bellinger | |
| 6,102,831 A * | 8/2000 | Wakahara et al. | 477/169 |
| 6,152,853 A | 11/2000 | Banks, III | |
| 6,223,592 B1 | 5/2001 | Genise | |
| 6,663,533 B2 | 12/2003 | Toyoda et al. | |
| 6,770,008 B2 * | 8/2004 | Shinojima et al. | 477/172 |
| RE38,615 E * | 10/2004 | Dresden et al. | 477/86 |
| 7,252,620 B2 * | 8/2007 | Kiuchi | 477/62 |
| 2001/0003720 A1 | 6/2001 | Lee | |

FOREIGN PATENT DOCUMENTS

| | | |
|---|---|---|
| EP | 1302358 | 4/2003 |
| EP | 1544514 | 6/2005 |
| JP | 05-141526 | 8/1998 |

* cited by examiner

Primary Examiner—Charles A Marmor
Assistant Examiner—Derek D Knight
(74) Attorney, Agent, or Firm—Finnegan, Henderson, Farabow, Garrett & Dunner

(57) ABSTRACT

A retarding system for a work machine is disclosed. The retarding system has a power source, a transmission, and a torque converter operatively coupling the power source and the transmission. The torque converter has a lockup clutch. The retarding system also has a controller in communication with the lockup clutch. The torque converter is configured to receive an input indicative of a desired work machine acceleration, to determine a status of the lockup clutch, and to determine if engaging the lockup clutch will cause a speed of the power source to drop below a low idle speed. The controller is also configured to engage the lockup clutch if the input indicates that the desired work machine acceleration is below a predetermined amount, the lockup clutch is disengaged, and the speed of the power source will remain above the low idle speed after engagement of the lockup clutch.

24 Claims, 3 Drawing Sheets

RETARDING SYSTEM IMPLEMENTING TORQUE CONVERTER LOCKUP

TECHNICAL FIELD

The present disclosure relates generally to a retarding system and, more particularly, to a retarding system that implements torque converter lockup.

BACKGROUND

Work machines, including on and off-highway haul and vocational trucks, wheel loaders, motor graders, and other types of heavy machinery generally include a multi-speed, bidirectional, automatic transmission drivingly coupled to an engine by way of a hydraulic torque converter. The hydraulic torque converter multiplies and/or absorbs torque fluctuations transmitted from the engine to the transmission by allowing slippage between an output shaft of the engine and an input shaft of the engine. To improve fuel consumption and reduce power loss due to the slippage, the torque converter typically includes a lockup clutch for mechanically coupling the engine output and transmission input shafts.

When the engine output and transmission input shafts are mechanically coupled, the engine can be used to slow the work machine's travel. For example, power can be transferred from the wheels of the work machine in reverse direction through the transmission to drive the mechanically coupled engine. The natural resistance of the engine then dissipates some of the transferred power, thereby slowing the work machine. Additional power may be dissipated by the use of engine or exhaust braking that increases the resistance of the engine. However, because typical torque converters disengage the lockup clutch at low vehicle speeds to minimize the likelihood of stalling the engine, the retarding capacity of the work machine may be greatly reduced at these low vehicle speeds. That is, little or no power may be transferred from the wheels to the engine when the lockup clutch is disengaged and slippage is allowed to occur.

One method of improving the retarding capacity of a work machine at low travel speeds is described in U.S. Pat. No. 6,152,853 (the '853 patent) issued to Banks, III Nov. 28, 2000. The '853 patent describes an exhaust braking system that includes a vehicle speed sensor, an exhaust brake valve, and a controller in communication with a lockup clutch and a transmission. If a sensed vehicle speed is greater than a speed value preset by an operator via a user interface, the controller engages the lockup clutch and closes the exhaust brake valve to bring the vehicle speed back down to the preset speed value. If it is determined that the vehicle speed is greater than the preset speed value and increasing, additional retarding may be implemented by downshifting the transmission.

Although the exhaust braking system of the '853 patent may sufficiently control the travel speed of a vehicle, it may be inadequate for some situations and excessive for others. In particular, because the exhaust braking system of the '853 patent only engages when the vehicle speed exceeds the operator preset speed value, it may do nothing to retard the vehicle when the vehicle operates at speeds lower than the preset speed value, even if engine retarding is desired. In addition, because the lockup clutch only engages when the exhaust brake valve is activated, lower levels of retarding that require only the natural resistance of the engine may not be possible.

The disclosed retarding system is directed to overcoming one or more of the problems set forth above.

SUMMARY OF THE INVENTION

In one aspect, the present disclosure is directed to a retarding system for a work machine. The retarding system includes a power source, a transmission, and a torque converter operatively coupling the power source and the transmission. The torque converter has a lockup clutch. The retarding system also includes a controller in communication with the lockup clutch. The controller is configured to receive an input indicative of a desired work machine acceleration, determine a status of the lockup clutch, and determine if engaging the lockup clutch will cause a speed of the power source to drop below a low idle speed. The retarding system is further configured to engage the lockup clutch if the input indicates that the desired work machine acceleration is below a predetermined amount, the lockup clutch is disengaged, and the speed of the power source will remain above the low idle speed after engagement of the lockup clutch.

In yet another aspect, the present disclosure is directed to a method of decelerating a work machine. The method includes receiving an input indicative of a desired work machine acceleration, determining a status of a torque converter lockup clutch, and determining if engaging the torque converter lockup clutch will cause a speed of a work machine power source to drop below a low idle speed. The method also includes engaging the torque converter lockup clutch if the input indicates that a desired work machine acceleration is below a predetermined amount, the torque converter lockup clutch is currently disengaged, and the speed of the work machine power source will remain above the low idle speed after engagement of the torque converter lockup clutch.

DETAILED DESCRIPTION

Figure 1:
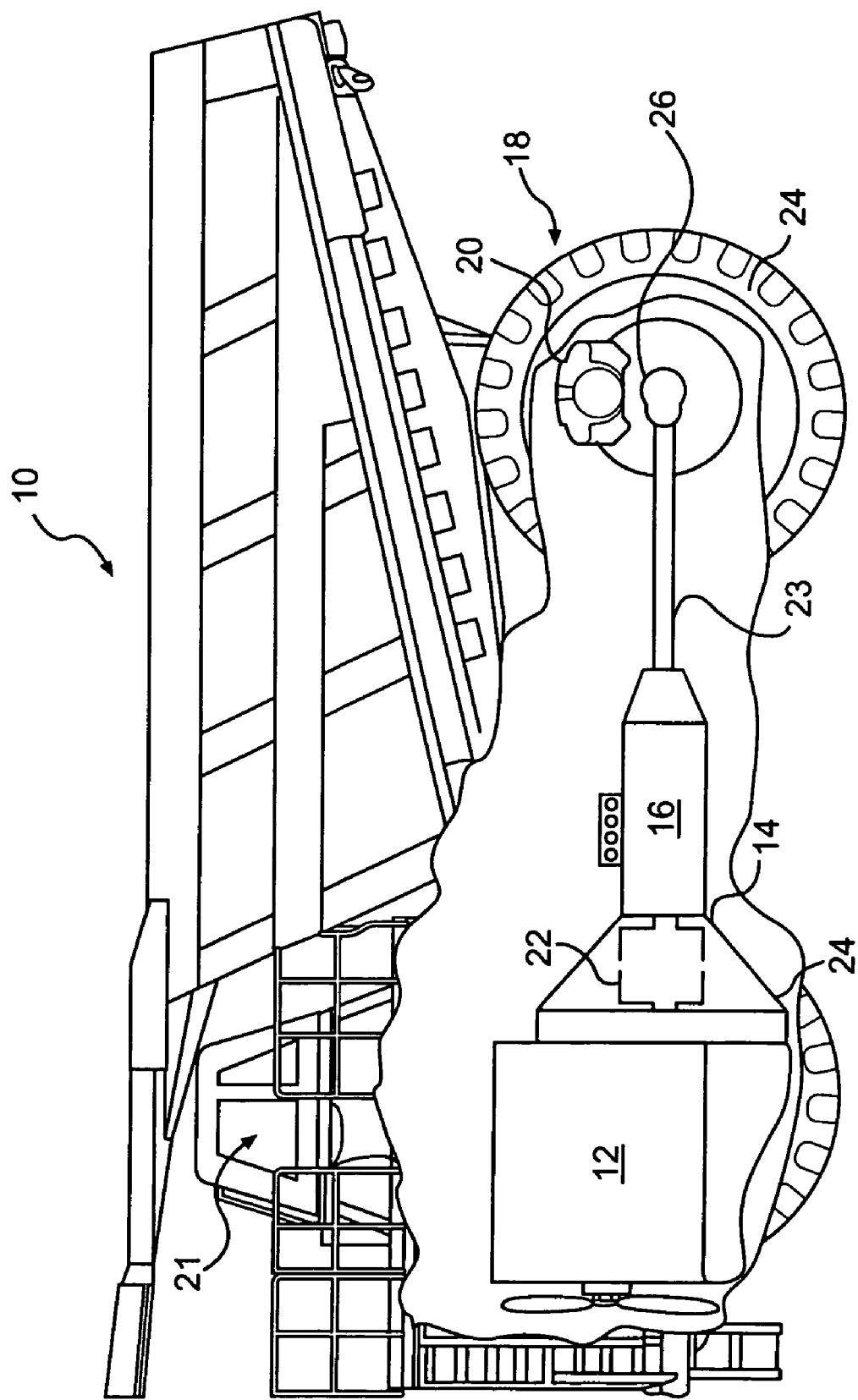
FIG. 1 is a diagrammatic illustration of an exemplary disclosed work machine.

FIG. 1 illustrates an exemplary work machine 10. Work machine 10 may embody a mobile machine that performs some type of operation associated with an industry such as mining, construction, farming, transportation, or any other industry known in the art. For example, work machine 10 may be an earth moving machine such as an off-highway haul truck, a wheel loader, a motor grader, or any other suitable earth moving machine. Work machine 10 may alternatively embody an on-highway vocational truck, a passenger vehicle, or any other operation-performing work machine. Work machine 10 may include, among other things, a power source 12, a torque converter 14, a transmission 16 operably connected to a traction device 18, a brake mechanism 20, and an operator station 21.

Power source 12 may be configured to produce a power output and may include an internal combustion engine. For example, power source 12 may include a diesel engine, a gasoline engine, a gaseous fuel-powered engine, or any other engine apparent to one skilled in the art. It is contemplated that power source 12 may alternatively include a non-combustion source such as, for example, a battery, a fuel cell, a motor, or any other known non-combustion source of power.

Torque converter 14 may be a hydro-mechanical device configured to couple power source 12 to transmission 16. In particular, torque converter 14 may conduct pressurized fluid between the output of power source 12 and the input of transmission 16 to thereby drive transmission 16, while still allowing power source 12 to rotate somewhat independently of transmission 16. In addition, torque converter 14 may include a lockup clutch 22 for directly mechanically coupling the output of power source 12 to the input of transmission 16. Lockup clutch 22 may engage and disengage in response to one or more inputs, as will be described in more detail below. In this arrangement, torque converter 14 may selectively absorb and multiply the torque transferred between power source 12 and transmission 16 by either allowing or preventing slippage between the output rotation of power source 12 and input rotation of transmission 16. It is contemplated that lockup clutch 22 may generate a signal indicative of the status of lockup clutch 22 (i.e., engaged or disengaged) during operation f torque converter 14. It is also contemplated that the status of lockup clutch 22 may alternatively be determined by comparing an output rotational speed of power source 12 to an input rotational speed of transmission 16. It is further contemplated that torque converter 14 may alternatively embody a non-hydraulic device such as, for example, a mechanical diaphragm clutch.

Transmission 16 may include numerous components that interact to transmit power from power source 12 to traction device 18. In particular, transmission 16 may embody a multi-speed, bidirectional, mechanical transmission having a neutral gear ratio, a plurality of forward gear ratios, a reverse gear ratio, and one or more clutches (not shown). The clutches may be selectively actuated to engage predetermined combinations of gears (not shown) that produce a desired output gear ratio. Transmission 16 may be an automatic-type transmission, wherein shifting is based on a power source speed, a maximum selected gear ratio, and a shift map stored within a transmission controller. The output of transmission 16 may be connected to rotatably drive traction device 18 via a shaft 23, thereby propelling work machine 10.

Traction device 18 may include wheels 24 located on each side of work machine 10 (only one side shown). Alternately, traction device 18 may include tracks, belts, or other driven traction devices. Traction device 18 may be driven by transmission 16 to rotate in accordance with an output rotation of transmission 16.

Brake mechanism 20 may be configured to retard the motion of work machine 10 and may be operably associated with each wheel 24 of work machine 10. In one embodiment, brake mechanism 20 is a hydraulic pressure-actuated wheel brake such as, for example a disk brake or a drum brake disposed intermediate wheel 24 and a drive assembly 26. It is contemplated that brake mechanism 20 may alternatively embody another non-hydraulic type of wheel brake such as an electric motor or any other similar mechanism known in the art.

Figure 2:
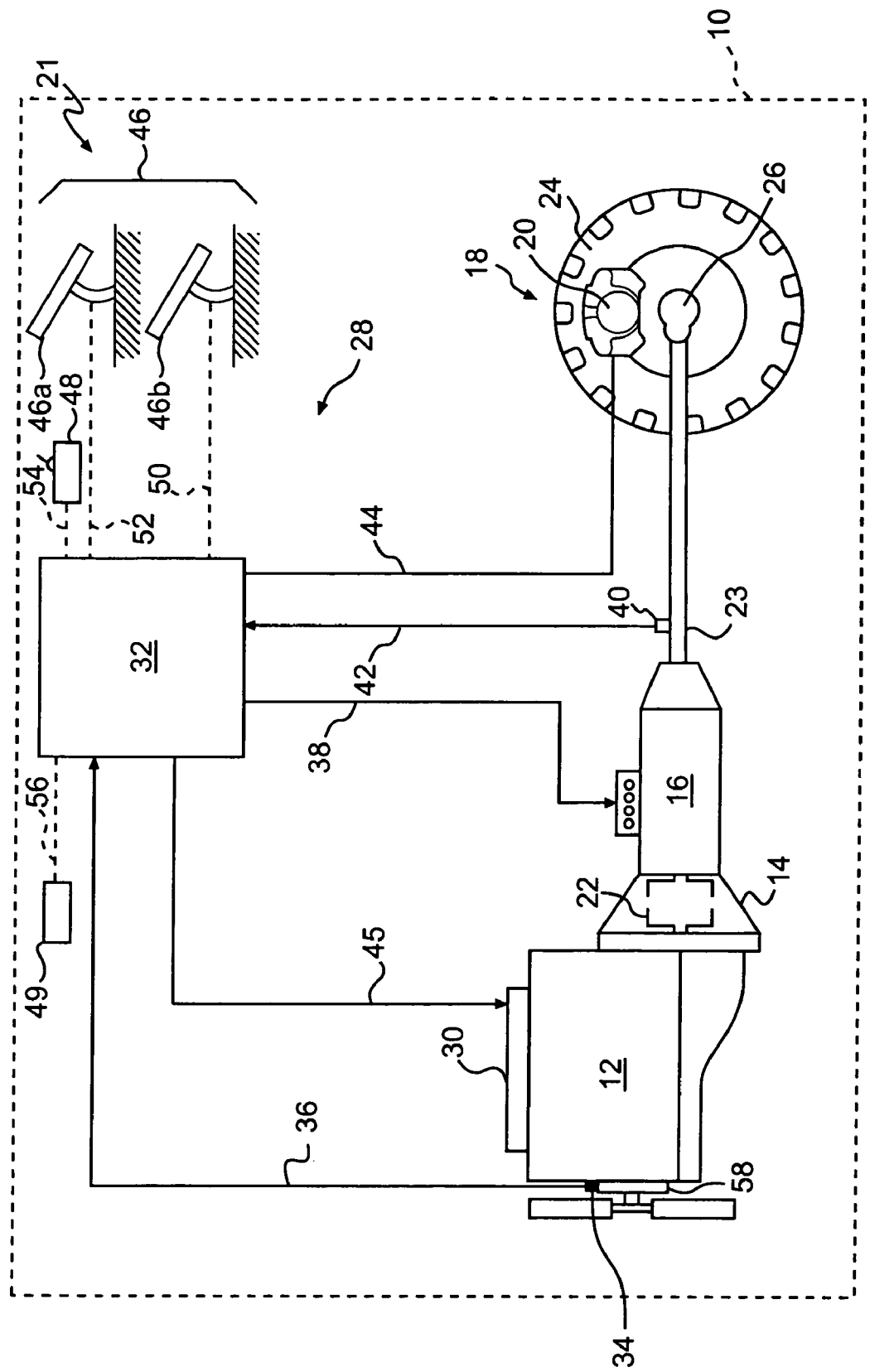
FIG. 2 is a diagrammatic illustration of an exemplary disclosed retarding system for the work machine of FIG. 1.

Operator station 21 may be configured to receive input from a work machine operator indicative of a desired acceleration of work machine 10. Specifically, as illustrated in FIG. 2, operator station 21 may include one or more operator interface devices 46 such as a throttle pedal 46a and a brake pedal 46b located forward of an operator seat. Operator interface devices 46 may embody proportional-type controllers configured to increase or decrease the acceleration of work machine 10 by producing an acceleration signal that is indicative of a desired work machine acceleration. It is contemplated that different operator interface devices may alternatively or additionally be included within operator station 21 such as, for example, single or multi-axis joysticks, wheels, knobs, push-pull devices, switches, and other operator interface devices known in the art.

Throttle pedal 46a may be manually actuated to increase the rotational speed of power source 12 and the resulting travel speed work machine 10. In particular, a degree of throttle pedal actuation may represent a desired acceleration and proportionally control an amount of fuel supplied to power source 12. It is contemplated that throttle pedal 46a may embody a mechanical device, an electrical device, a hydraulic device, or any other type of device known in the art.

A throttle sensor (not shown) may be provided for indicating whenever throttle pedal 46a is actively indicating a desired acceleration of work machine 10, and the magnitude of the desired acceleration. The throttle sensor may embody, for example, a switch or a pressure sensor capable of producing an electric signal indicating that positive acceleration is being requested. A switch may indicate a position or angle of throttle pedal 46a, while a pressure sensor may indicate a pressure of a pilot fluid pressurized by the motion of throttle pedal 46a.

Brake pedal 46b may be manually operated to direct pressurized fluid to brake mechanism 20. A degree of brake pedal actuation may proportionally control a pressure and/or a flow rate of the fluid supplied to brake mechanism 20. It is contemplated that brake mechanism 20 may alternatively be pneumatically actuated, mechanically actuated, electrically actuated, or actuated in any other manner known in the art.

A brake sensor (not shown) may be provided for indicating whenever active retarding (e.g. negative acceleration) of work machine travel is desired and what magnitude of retarding is desired. The brake sensor may embody, for example, a switch or a pressure sensor capable of producing an electric signal indicating that negative acceleration is requested. A switch may indicate a position or angle of brake pedal 46b, while a pressure sensor may indicate a pressure of a pilot fluid pressurized by brake pedal 46b.

As also illustrated in FIG. 2, work machine 10 may further include a retarding system 28 having components that cooperate with brake mechanism 20 and transmission 16 to decelerate work machine 10. In particular, retarding system 28 may include an engine-retarder 30 and a controller 32.

Engine retarder 30 may embody any device that selectively increases the natural resistance of power source 12 to motion. For example, engine retarder 30 may embody an engine brake or an exhaust brake. An engine brake may function to open the exhaust valves (not shown) of power source 12 near the top dead center (TDC) position of a piston's compression stroke. By opening the exhaust valves near top dead center of the compression stroke, highly-compressed air may be vented to the atmosphere, thereby removing stored energy from the associated pistons of power source 12. On the ensuing downward power stroke, essentially no energy is returned to the piston (and to traction device 18), resulting in a deceleration of work machine 10. In contrast, an exhaust brake may include a butterfly-type valve disposed within an exhaust manifold of power source 12 to restrict the exiting flow of exhaust gases. The restricted flow of exhaust gases may cause a backup of pressure within power source 12 that increases the work that the pistons of power source 12 must perform during the compression and exhaust strokes of power source 12, resulting in a deceleration of work machine 10. It is contemplated that engine retarder 30 may alternatively be located immediately upstream of torque converter 14 (referring to the flow of power during normal operation of work machine 10) to directly remove power from the input of transmission 16 (e.g., transmission braking). It is further contemplated that engine retarder 30 may be hydraulically operated, mechanically operated, electrically operated, pneumatically operated, or operated in any other suitable manner.

Controller 32 may embody a single microprocessor or multiple microprocessors that include a means for controlling an operation of retarding system 28. Numerous commercially available microprocessors can be configured to perform the functions of controller 32. It should be appreciated that controller 32 could readily embody a general work machine microprocessor capable of controlling numerous work machine functions. Various other known circuits may be associated with controller 32, including power supply circuitry, signal-conditioning circuitry, solenoid driver circuitry, communication circuitry and other appropriate circuitry.

Controller 32 may be in communication with various components of work machine 10. In particular, controller 32 may be in communication with a power source speed sensor 34 via a communication line 36 to receive an indication of a rotational speed of power source 12, with transmission 16 via a communication line 38 to affect downshifting of transmission 16, with a work machine travel speed sensor 40 via a communication line 42 to receive an indication of a travel speed of work machine 10, with brake mechanism 20 via a communication line 44 to determine whether brake mechanism 20 is active or inactive, and with engine retarder 30 via a communication line 45. Controller 32 may also be in communication with throttle pedal 46a, brake pedal 46b, a lockup clutch switch 48, and an inclinometer 49 via communication lines 50, 52, 54, and 56, respectively.

Power source and work machine travel speed sensors 34 and 40 may both embody magnetic pickup-type sensors. In particular, power source speed sensor 34 may be associated with a flywheel 58 of power source 12 and configured to sense a rotational speed and produce a corresponding speed signal. Similarly, work machine travel speed sensor 40 may be associated with shaft 23 and configured to sense a travel speed and produce a corresponding speed signal.

Lockup clutch switch 48 and inclinometer 49 may embody commonly known devices. For example, lockup clutch switch 48 may embody a wheel actuator, a knob actuator, a push-pull device, a switch, or any other operator interface device manually selectable to indicate that engagement of lockup clutch 22 is desired. Inclinometer 49 may be configured to monitor the grade on which work machine 10 is operating and to generate a signal indicative of the grade. It is contemplated that one or both of lockup clutch switch 48 and inclinometer 49 may be omitted, if desired.

As described above, lockup clutch 22 may be engaged to retard the motion of work machine 10 in response to one or more inputs. Specifically, controller 32 may receive input associated with throttle pedal 46a, brake pedal 46b, power source speed sensor 34, work machine travel speed sensor 40, and inclinometer 49, and engage lockup clutch 22 in response to the input. Controller 32 may automatically engage lockup clutch 22 in response to the input or only after receiving, via lockup clutch switch 48, a manual indication that lockup is desired. When lockup clutch 22 is engaged, wheels 24 may transmit power in a reverse direction through transmission 16 and lockup clutch 22 to power source 12, where the natural resistance of power source 12 may act to dissipate the power.

Controller 32 may include one or more maps stored within an internal memory of controller 32 and reference these maps to determine the affect of lockup clutch engagement on the speed of power source 12 before lockup clutch 22 is engaged. Each of these maps may include a collection of data in the form of tables, graphs, and/or equations. In one example, work machine travel speed and the current gear ratio of transmission 16 may form the coordinate axis of a 2-D table for determining the resulting speed of power source 12 after engagement of lockup clutch 22. In another example, work machine travel speed, the current gear ratio of transmission 16, and the current rotational speed of power source 12 may form the coordinate axis of a 3-D table. Controller 32 may compare the resulting speed of power source 12 to a predetermined low idle speed threshold (e.g., the speed at or about the stall speed of power source 12) and engage or prevent engagement of lockup clutch 22 in response to the comparison. It is contemplated that an operator of work machine 10 may be allowed to directly modify these maps and/or to select specific maps from available relationship maps stored in the memory of controller 32 to affect engagement of lockup clutch 22. It is further contemplated that the maps may alternatively be manually or automatically selectable based on modes of work machine operation.

Controller 32 may increase the natural resistance of power source 12, if it is determined that the current amount of retarding (e.g., the current rate of deceleration) after engagement of lockup clutch 22 is insufficient. Specifically, controller 32 may receive input associated with throttle pedal 46a and brake pedal 46b and determine whether or not additional deceleration is desired. Additional desired deceleration may be indicated by reducing an actuation position of throttle pedal 46a, increasing the actuation position of brake pedal 46b, and/or continued actuation of brake pedal 46b for an extended predetermined period of time. Alternatively, the current deceleration rate of work machine 10 may be directly monitored via power source speed sensor 34 or work machine travel speed sensor 40 and compared to a deceleration rate threshold value stored within the memory of controller 32. Controller 32 may then activate engine retarder 30 to increase the natural resistance of power source 12, thereby increasing the retarding affect.

In addition, controller 32 may initiate or increase accessory loading of power source 12 and/or work machine 10 if the current level of retarding is insufficient. Accessory loading of power source 12 and/or work machine 10 may include, among other things, the activation of a cooling fan, an air conditioning pump, a hydraulic implement pump, an electric generator, and other such devices that draw power from power source 12 and/or work machine 10.

Controller 32 may also be configured to initiate a downshift of transmission 16 to thereby increase the retarding effect of engine retarder 30. In particular, controller 32 may determine that engine retarder 30 is active and may determine a current deceleration rate of work machine 10 resulting from the operation of engine retarder 30. If the current deceleration rate of work machine 10 is less than desired or less than the predetermined deceleration threshold value, controller 32 may actuate the clutches of transmission 16 to selectively engage a predetermined combination of gears, thereby effecting the desired downshift.

Figure 3:
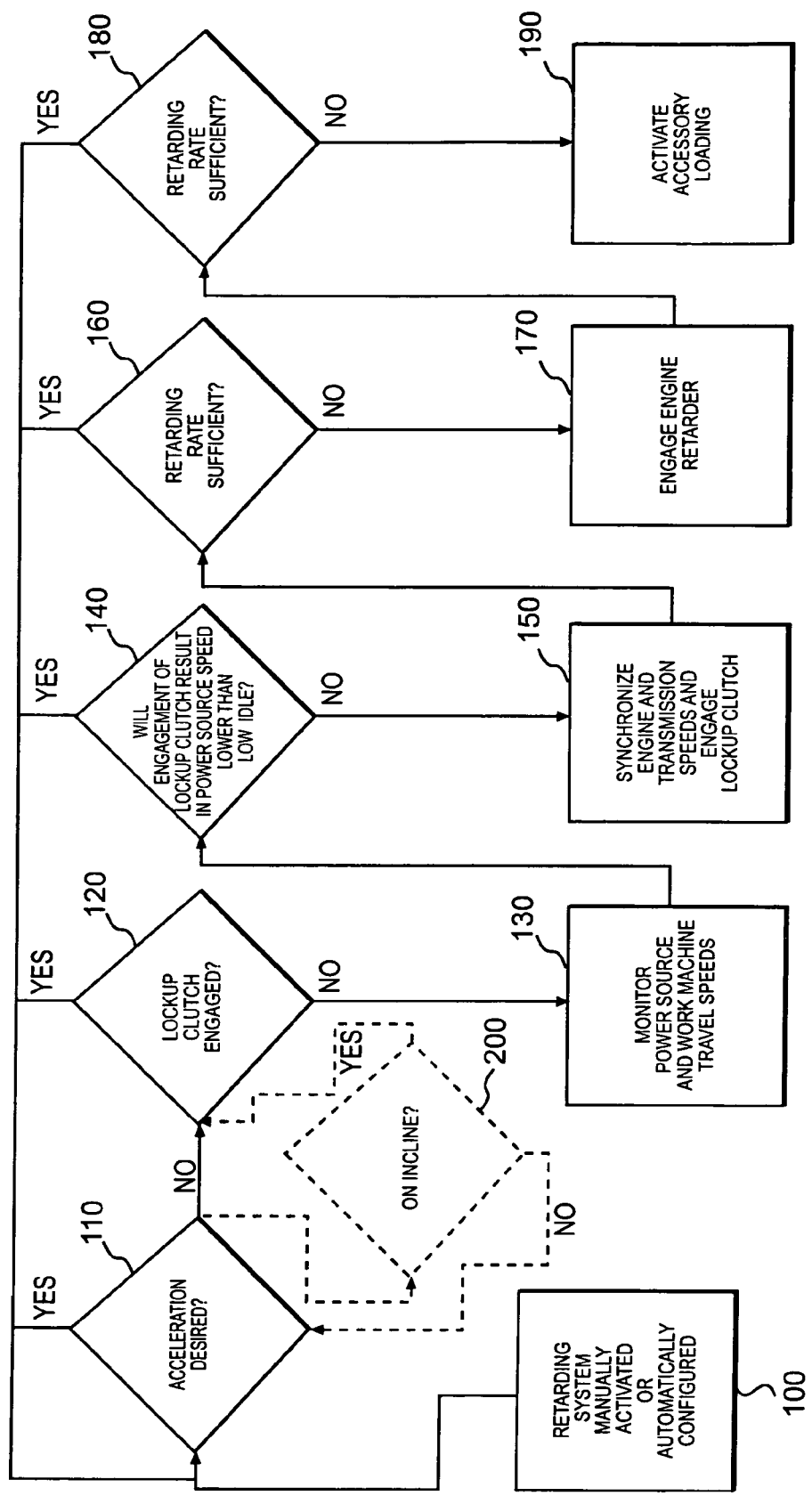
FIG. 3 is a flow chart depicting an exemplary method of operating the retarding system of FIG. 2.

FIG. 3 illustrates an exemplary operation of retarding system 28. FIG. 3 will be described in detail below.

INDUSTRIAL APPLICABILITY

The disclosed retarding system may be applicable to any work machine where retarding at low travel speeds is desired. The disclosed retarding system may selectively engage a lockup clutch of a hydro-mechanical torque converter to allow power transfer to and dissipation from a power source of the work machine. Operation of retarding system 28 will now be explained.

Referring to FIG. 3, the operation of retarding system 28 may initiate in one of two ways. In particular, an operator may manually initiate the operation of retarding system 28 via lockup clutch switch 48 or, alternatively, the operation of retarding system 28 may automatically be initiated in response to one or more input (Step 100). Retarding system 28 may be configured for automatic operation during a manufacturing process or, alternatively, may be configured by a service technician according to customer preference upon purchase or leasing of work machine 10.

Following activation of retarding system 28, controller 32 may determine whether or not acceleration of work machine 10 is desired (Step 110). As described above, signals generated by throttle pedal 46a and brake pedal 46b may provide the indication of operator-desired acceleration. For example, if throttle pedal 46a is situated in a depressed position and then released, it can be assumed that a negative acceleration (e.g., deceleration) of work machine 10 is desired. The rate of releasing may provide an indication of the magnitude of the desired deceleration. In contrast, if throttle pedal 46a is depressed to a greater extent, it can be assumed that a positive acceleration of work machine 10 is desired. Similarly, if brake pedal 46b is depressed, it can be assumed that a negative acceleration of work machine 10 is desired. The rate of depressing may provide an indication of the magnitude of the desired deceleration. In contrast, if brake pedal 46b is released from a depressed position, it can be assumed that the amount of deceleration is sufficient or that deceleration is no longer desired.

If positive acceleration is undesired (e.g., deceleration is desired), controller 32 may then determine the status of lockup clutch 22 (i.e., engaged or disengaged) (Step 120). Lockup clutch 22 may provide this status information automatically or only when prompted by controller 32. Alternatively, controller 32 may determine the status of lockup clutch 22 by comparing the rotational speed of power source 12 to the travel speed of work machine 10 and the current gear ratio of transmission 16. If positive acceleration is desired, control may return to step 110.

If lockup clutch 22 is disengaged, controller 32 may monitor both engine rotational and work machine travel speeds (Step 130). It is contemplated that step 130 may be performed continuously, before steps 100-120, or after steps 110-120. If lockup clutch 22 is already engaged, control may return to step 110.

Once controller 32 has determined that lockup clutch 22 is disengaged and has monitored the engine rotational and work machine travel speeds, controller 32 may then determine if the engagement of lockup clutch 22 will reduce the rotational speed of power source 12 below a predetermined low idle speed (Step 140). Controller 32 may determine the affect of lockup clutch engagement on power source 12 speed by comparing the input signals received via power source and travel speed sensors 34 and 40, and the gear ratio of transmission 16 with the maps stored in the memory of controller 32. If the speed of power source 12 drops below low idle speed, it may be possible for power source 12 to stall. Therefore, if the engagement of lockup clutch 22 will cause the rotational speed of power source 12 to drop below the low idle speed, control may return to step 110 without engagement of lockup clutch 22. Otherwise, if the speed of power source 12 will remain above the low idle speed after engagement of lockup clutch 22, controller 32 may synchronize the output speed of power source 12 to the input speed of transmission 16 and cause engagement of lockup clutch 22 (Step 150). The speeds of power source 12 and transmission 16 may be synchronized by increasing or decreasing the amount of fuel supplied to power source 12 to thereby raise or lower the speed of power source 12, by operating a motor (not shown) associated with power source 12 to drive power source 12 to a higher speed, by operating engine retarder 30 to reduce the speed of power source 12, by operating a transmission brake (not shown) to reduce a speed of transmission 16, or in any other suitable manner. By synchronizing the output speed of power source 12 and the input speed of transmission 16 prior to the engagement of lockup clutch 22, smooth engagement of lockup clutch 22 may be facilitated without complex and expensive pressure modulation systems or algorithms.

After engagement of lockup clutch 22, deceleration of work machine 10 should begin. Controller 32 may then determine if the current rate of retarding is sufficient (Step 160) and affect the rate of retarding in response to the determination. In particular, if controller 32 determines that the rate of retarding after engagement of lockup clutch 22 is insufficient (e.g., additional deceleration is desired), controller 32 may then activate engine retarder 30 to increase the resistance of power source 12 (Step 170). As described above, controller 32 may determine if the current rate of retarding is sufficient by monitoring the actuation of throttle and brake pedals 46a and 46b or, alternatively, by comparing the rate of deceleration to a predetermined deceleration threshold value. If the rate of retarding is sufficient, control may return to step 110 without activation of engine retarder 30.

After activation of engine retarder 30, deceleration of work machine 10 should increase. Controller 32 may then again determine if the current rate of retarding is sufficient (Step 180). If controller 32 determines that the rate of retarding after activation of engine retarder 30 is insufficient, controller 32 may then activate accessory loading to increase the resistance of power source 12. Activation of accessory loading may include, among other things, operating a cooling fan, operating an air conditioning system, operating an electric generator, operating a hydraulic implement pump, or operating any other component of work machine 10 that draws power from power source 12. It is contemplated that if the rate of deceleration is still insufficient after the activation of accessory loading transmission 16, controller 32 may automatically trigger transmission 16 to initiate a downshift, thereby transferring a greater amount of power to power source 12 for dissipation. If the rate of retarding is sufficient, control may return to step 110 without activating accessory loading.

An alternative condition may be required of retarding system 28 prior to the initial engagement of torque converter lockup clutch 22. Specifically, between steps 110 and 120, controller may communicate with inclinometer 49, if desired, to determine if work machine 10 is operating on an incline (Step 200). Controller 32 may then continue on to step 120 if work machine is operating on an incline greater than a predetermined amount, or return control to step 110 if working on a substantially level surface. In this manner, lockup clutch 22 may only engage if the likelihood exists of work machine 10 involuntarily accelerating down an incline.

Several advantages of retarding system 28 may be realized over the prior art. In particular, because controller 32 can engage lockup clutch 22 at nearly any travel speed of work machine 10, retarding system 28 may provide a broader speed range of retarding. In addition, because retarding system 28 can engage lockup clutch 22 without having to activate engine retarder 30, retarding system 28 may provide a more efficient retarding system, with the levels of retarding tailored to meet the needs of work machine 10 and its operator.

It will be apparent to those skilled in the art that various modifications and variations can be made to the retarding system of the present disclosure. Other embodiments of the retarding system will be apparent to those skilled in the art from consideration of the specification and practice of the retarding system disclosed herein. It is intended that the specification and examples be considered as exemplary only, with a true scope of the disclosure being indicated by the following claims and their equivalents.

What is claimed is:

1. A retarding system for a machine, comprising:
a power source;
a transmission;
a torque converter operatively coupling the power source and the transmission, the torque converter having a lockup clutch; and
a controller in communication with the lockup clutch and configured to:
receive a signal indicative of a desired machine acceleration;
determine a status of the lockup clutch;
determine if engaging the lockup clutch will cause a speed of the power source to drop below a low idle speed; and
engage the lockup clutch if:
the signal indicates that the desired machine acceleration is below a predetermined amount;
the lockup clutch is disengaged; and
the speed of the power source will remain above the low idle speed after engagement of the lockup clutch.

2. The retarding system of claim 1, wherein the machine includes a throttle pedal and the signal indicative of the desired machine acceleration corresponds to an actuation position of the throttle pedal.

3. The retarding system of claim 1, wherein the machine includes a brake pedal and the signal indicative of the desired machine acceleration corresponds to an actuation position of the brake pedal.

4. The retarding system of claim 3, wherein the signal indicative of the desired machine acceleration also corresponds to an elapsed time that the brake pedal remains at the actuation position.

5. The retarding system of claim 1, wherein the controller is further configured to synchronize the output speed of the power source and the input speed of the transmission prior to engagement of the lockup clutch.

6. The retarding system of claim 1, wherein the controller is configured to determine the rate of retarding after engagement of the lockup clutch and to implement at least one of engine braking, exhaust braking, and transmission braking if the rate is retarding is insufficient.

7. The retarding system of claim 6, wherein the controller is configured to determine the rate of retarding after implementing the at least one of engine braking, exhaust braking, and transmission braking and to add accessory loading to the power source if the rate of retarding is insufficient.

8. The retarding system of claim 7, wherein the controller is configured to determine if the rate of retarding is sufficient by monitoring an actuation position of an operator input device.

9. The retarding system of claim 1, further including an operator input device movable to indicate an operator's desire to engage the lockup clutch, wherein engagement of the lockup clutch is only possible if the operator input device has been moved.

10. The retarding system of claim 1, wherein the predetermined amount is about zero.

11. A method of decelerating a machine, comprising:
receiving a signal indicative of a desired machine acceleration;
determining a status of a torque converter lockup clutch;
determining if engaging the torque converter lockup clutch will cause a speed of a machine power source to drop below a low idle speed; and
engaging the torque converter lockup clutch if:
the signal indicates that a desired machine acceleration is below a predetermined amount;
the torque converter lockup clutch is currently disengaged; and
the speed of the machine power source will remain above the low idle speed after engagement of the torque converter lockup clutch.

12. The method of claim 11, wherein the signal indicative of the desired machine acceleration corresponds to an actuation position of at least one of a throttle pedal and a brake pedal.

13. The method of claim 12, wherein the signal indicative of the desired machine acceleration also corresponds to an elapsed time that the at least one of the throttle pedal and the brake pedal remains at the actuation position.

14. The method of claim 11, further including synchronizing the output speed of the power source and the input speed of the transmission prior to engagement of the torque converter lockup clutch.

15. The method of claim 11, further including:
determining a first rate of deceleration after engaging the torque converter lockup clutch; and
implementing at least one of engine braking, exhaust braking, and transmission braking if the first deceleration rate is insufficient.

16. The method of claim 15, further including:
determining a second rate of deceleration after implementing the at least one of engine braking, exhaust braking, and transmission braking; and
implementing accessory loading if the second deceleration rate is insufficient.

17. The method of claim 16, further including monitoring the position of an operator input device to determine if the first and second rates of deceleration are sufficient.

18. The method of claim 11, further including:
receiving an input indicative of an operator's desire to engage the torque converter lockup clutch; and
engaging the torque converter lockup clutch only if the input indicates the operator desires to engage the torque converter lockup clutch.

19. The method of claim 11, wherein the predetermined amount is about zero.

20. A machine, comprising:
a power source configured to produce a power output;
a traction device configured to propel the machine;
a transmission connected to transmit the power output to the traction device;
a torque converter operatively coupling the power source and the transmission, the torque converter having a lockup clutch; and
a controller in communication with the lockup clutch and configured to:
receive signal indicative of a desired machine acceleration;
determine a status of the lockup clutch;
determine if engaging the lockup clutch will cause a speed of the power source to drop below a low idle speed; and engage the lockup clutch if:
- the signal indicates that the desired machine acceleration is below a predetermined amount;
- the lockup clutch is disengaged; and
- the speed of the power source will remain above the low idle speed after engagement of the lockup clutch.

21. The machine of claim 20, wherein:
the machine includes a throttle pedal and a brake pedal; and
the signal indicative of the desired machine acceleration corresponds to an actuation position of at least one of the throttle pedal and the brake pedal, and to an elapsed time that the at least one of the throttle pedal and the brake pedal remains at the actuation position.

22. The machine of claim 20, wherein the controller is configured to:
- determine if the rate of retarding after engagement of the lockup clutch is sufficient by monitoring an actuation position of an operator input device; and
- implement at least one of engine braking, exhaust braking, transmission braking, and accessory loading if the rate of retarding is insufficient.

23. The machine of claim 20, further including an operator input device movable to indicate an operator's desire to engage the lockup clutch, wherein engagement of the lockup clutch is only possible if the operator input device has been moved.

24. The machine of claim 20, wherein the predetermined amount is about zero.

* * * * *